United States Patent
Onoe et al.

(10) Patent No.: US 10,125,649 B2
(45) Date of Patent: Nov. 13, 2018

(54) EXHAUST GAS PURIFICATION CATALYST

(71) Applicants: CATALER CORPORATION, Kakegawa-shi, Shizuoka (JP); TOYOTA JIDOSHA KABUSHIKI KAISHA, Toyota-shi, Aichi (JP)

(72) Inventors: Ryota Onoe, Kakegawa (JP); Shingo Sakagami, Kakegawa (JP); Tsuyoshi Ito, Kakegawa (JP); Masahiko Takeuchi, Toyota (JP); Naoto Miyoshi, Toyota (JP); Akemi Sato, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/517,311

(22) PCT Filed: Oct. 7, 2015

(86) PCT No.: PCT/JP2015/078549
§ 371 (c)(1),
(2) Date: Apr. 6, 2017

(87) PCT Pub. No.: WO2016/060048
PCT Pub. Date: Apr. 21, 2016

(65) Prior Publication Data
US 2017/0306823 A1    Oct. 26, 2017

(30) Foreign Application Priority Data

Oct. 16, 2014  (JP) ................................. 2014-211379

(51) Int. Cl.
*F01N 3/28*    (2006.01)
*B01D 53/94*   (2006.01)
(Continued)

(52) U.S. Cl.
CPC ............... *F01N 3/28* (2013.01); *B01D 53/94* (2013.01); *B01D 53/945* (2013.01); *B01J 21/04* (2013.01);
(Continued)

(58) Field of Classification Search
CPC .......... F01N 3/022; F01N 3/28; F01N 3/0222; B01D 2255/1021; B01D 2255/1025
(Continued)

(56) References Cited

U.S. PATENT DOCUMENTS 7,951,338 B2 *  5/2011  Miyairi .............. B01D 46/2429
                                                422/177
2006/0057046 A1   3/2006  Punke et al.
(Continued)

FOREIGN PATENT DOCUMENTS

EP    2 873 817 A1    5/2015
JP    2007-185571 A    7/2007
(Continued)

OTHER PUBLICATIONS

Oct. 11, 2017 extended Search Report issued in European Patent Application No. 15850507.3.

*Primary Examiner* — Tom P Duong
(74) *Attorney, Agent, or Firm* — Oliff PLC

(57) ABSTRACT

An exhaust gas purification catalyst that has an excellent exhaust gas purification performance while suppressing pressure loss increases. The exhaust gas purification catalyst is provided with a substrate having a wall-flow structure and having a partition; a first catalyst layer formed, in a region of an interior part of the partition that is in contact with an entrance cell, along the extending direction of the partition from an exhaust gas inflow-side end for less than the total length $L_w$ of the partition; and a second catalyst layer formed, in a region of an interior part of the partition that is
(Continued)

in contact with an exit cell, along the extending direction of the partition from the exhaust gas outflow-side end for less than the total length $L_w$ of the partition. The first catalyst layer and the second catalyst layer are configured to partially overlap with each other in the extending direction.

9 Claims, 4 Drawing Sheets

(51) Int. Cl.
*B01J 35/04* (2006.01)
*F01N 3/022* (2006.01)
*F01N 3/035* (2006.01)
*B01J 21/04* (2006.01)
*B01J 23/10* (2006.01)
*B01J 23/42* (2006.01)
*B01J 23/44* (2006.01)
*B01J 23/46* (2006.01)
*B01J 35/00* (2006.01)
*B01J 37/02* (2006.01)
*B01J 37/08* (2006.01)

(52) U.S. Cl.
CPC ............... *B01J 23/10* (2013.01); *B01J 23/42* (2013.01); *B01J 23/44* (2013.01); *B01J 23/464* (2013.01); *B01J 35/0006* (2013.01); *B01J 35/04* (2013.01); *B01J 37/0236* (2013.01); *B01J 37/0244* (2013.01); *B01J 37/088* (2013.01); *F01N 3/022* (2013.01); *F01N 3/0222* (2013.01); *F01N 3/035* (2013.01); *B01D 2255/1021* (2013.01); *B01D 2255/1023* (2013.01); *B01D 2255/1025* (2013.01); *B01D 2255/2065* (2013.01); *B01D 2255/20715* (2013.01); *B01D 2255/407* (2013.01); *B01D 2255/9022* (2013.01); *B01D 2255/9155* (2013.01); *F01N 2510/0682* (2013.01); *Y02T 10/20* (2013.01)

(58) Field of Classification Search
USPC .................................................. 422/177, 180
See application file for complete search history.

(56) References Cited

U.S. PATENT DOCUMENTS

| | | |
|---|---|---|
| 2008/0020922 A1 | 1/2008 | Li et al. |
| 2009/0087365 A1 | 4/2009 | Klingmann et al. |
| 2010/0175372 A1 | 7/2010 | Lambert et al. |
| 2011/0030346 A1 | 2/2011 | Neubauer et al. |
| 2011/0078997 A1 | 4/2011 | Boorse et al. |
| 2011/0179777 A1* | 7/2011 | Chandler ............ F01N 3/0222 60/297 |
| 2012/0247092 A1 | 10/2012 | Boorse |

FOREIGN PATENT DOCUMENTS

| | | |
|---|---|---|
| JP | 2009-082915 A | 4/2009 |
| JP | 2012-236180 A | 12/2012 |
| JP | 2013-500857 A | 1/2013 |
| WO | 2014/002772 A1 | 1/2014 |

* cited by examiner

EXHAUST GAS PURIFICATION CATALYST

TECHNICAL FIELD

The present invention relates to an exhaust gas purification catalyst that is disposed in an exhaust system of an internal combustion engine. More particularly, the present invention relates to a wall-flow exhaust gas purification catalyst.

This international application claims priority based on Japanese Patent Application 2014-211379 filed Oct. 16, 2014, and the contents of said application are incorporated in their entirety in this Description by reference.

BACKGROUND ART

The exhaust gas discharged from an internal combustion engine, e.g., an automotive engine, contains harmful components such as particulate matter (PM), hydrocarbons (HC), carbon monoxide (CO), nitrogen oxides ($NO_x$), and so forth. A wall-flow exhaust gas purification catalyst is used to efficiently remove these exhaust gas components.

A wall-flow exhaust gas purification catalyst are provided with an entrance cell having an open exhaust gas inflow-side end, an exit cell having an open exhaust gas outflow-side end, and a porous partition (rib wall) that partitions the two types of cells from each other. The exhaust gas discharged from the internal combustion engine flows into and within the entrance cell from the exhaust gas inflow-side end, passes through the pores of the porous partition, and flows out from the exhaust gas outflow-side end of the exit cell. The components of the exhaust gas are purified (detoxified) by contact between the exhaust gas and a catalyst layer (catalyst metal).

Patent Literature 1 and Patent Literature 2 are examples of prior art documents related to this. For example, Patent Literature 1 discloses an exhaust gas purification catalyst that is provided with a catalyst layer having a two-layer structure. Specifically, an exhaust gas purification catalyst is disclosed that is provided with a Pd-containing first catalyst layer over the entire interior part of the partition and that is provided with an Rh-containing second catalyst layer on the surface of the partition on the side in contact with the entrance cell so as to completely coat the first catalyst layer.

CITATION LIST

Patent Literature

Patent Literature 1: Japanese Patent Application Publication No. 2009-82915
Patent Literature 2: Japanese Patent Application Publication No. 2007-185571

SUMMARY OF INVENTION

However, investigations by the present inventors confirmed that there was room for improvement in the disposition of the catalyst metal in the exhaust gas purification catalyst. Thus, with the exhaust gas purification catalyst, a first catalyst layer is provided over the entire interior part of the partition and a second catalyst layer is formed thereon throughout. An excessive rise in the pressure loss occurred when the surface of such an entrance cell was coated by the catalyst layers.

The present invention was created in order to solve this problem, and an object of the present invention is to provide an exhaust gas purification catalyst that exhibits an excellent exhaust gas purification performance while suppressing increases in the pressure loss.

Upon carrying out investigations from various perspectives, the present inventors found that, as compared to the broad formation of the catalyst layer over the entire partition, a higher purification performance is obtained when the catalyst layer is formed in a concentrated manner on the partition near the exhaust gas inflow-side end (for example, the partition in the vicinity of the exhaust gas inflow-side end) and on the partition near the exhaust gas outflow-side end (for example, the partition in the vicinity of the exhaust gas outflow-side end).

On the other hand, according to investigations by the present inventors, when a region is present in the extending direction of the partition where a catalyst layer is not formed, a large exhaust gas flow to this region then occurs based on pressure loss considerations. It was found that as a consequence the harmful components in the exhaust gas slip through the region where the catalyst layer is not formed and the exhaust emissions deteriorate.

The present inventors carried out additional intensive and extensive investigations based on these findings and achieved the creation of the present invention, which can realize the object indicated above.

The exhaust gas purification catalyst according to the present invention is a wall-flow exhaust gas purification catalyst that is disposed in an exhaust pipe of an internal combustion engine, e.g., an automobile engine, and that performs purification of an exhaust gas discharged from the internal combustion engine. The herein disclosed exhaust gas purification catalyst is provided with a substrate having a wall flow structure and with a first catalyst layer and a second catalyst layer. This substrate is provided with an entrance cell having an open exhaust gas inflow-side end, an exit cell adjacent to the entrance cell and having an open exhaust gas outflow-side end, and a porous partition that partitions the entrance cell from the exit cell. The first catalyst layer is formed at an interior part of the partition in contact with the entrance cell and along the extending direction of the partition from the exhaust gas inflow-side end for less than the total length $L_w$ of the partition. A second catalyst layer is formed at an interior part of the partition in contact with the exit cell and along the extending direction of the partition from the exhaust gas outflow-side end for less than the total length $L_w$ of the partition. Using $L_1$ for the length of the first catalyst layer in the extending direction and $L_2$ for the length of the second catalyst layer in the extending direction, a structure is provided in which the first catalyst layer partially overlaps with the second catalyst layer in the extending direction such that the following formula is satisfied $L_w < (L_1 + L_2) < 2L_w$.

The catalyst layer can be efficiently utilized by disposing the catalyst layer in a concentrated manner in regions that make a large contribution to the exhaust gas purification performance (i.e., the vicinity of the exhaust gas inflow-side end and the vicinity of the exhaust gas outflow-side end). A high purification performance can be realized as a result. In addition, by executing a partial overlap—considered in the extending direction of the partition—between the first catalyst layer and the second catalyst layer, "slip through" of the exhaust gas can be prevented and a proper purification (detoxification) of the exhaust gas components can be accomplished. The exhaust gas emissions can be effectively lowered as a result. Moreover, increases in the pressure loss can be suppressed by forming the two catalyst layers at their respective interior parts of the partition at each less than the total length $L_w$ of the partition.

In this Description, the catalyst layer being "formed in an interior part of the partition" means that the majority of the catalyst layer is present in (segregated to) the interior part of the partition. For example, let 100 mass % be the total amount of catalyst metal in the range of a length of $0.1L_w$ in the extending direction from the exhaust gas inflow-side end when the cross section of the first catalyst layer is observed using an electron microscope. Although there is no particular limitation to the following, the catalyst metal present in the interior part side of the partition here may typically be at least 80 mass %, for example, at least 90 mass % and preferably at least 95 mass %. Accordingly, this can be clearly distinguished, for example, from the case in which a catalyst layer is formed on the exterior part (typically the surface) of the partition and as a result a portion of this catalyst layer also unintentionally penetrates to the interior part of the partition.

In a preferred aspect of the herein disclosed exhaust gas purification catalyst, the length of the overlap between the first catalyst layer and the second catalyst layer is at least 2% and not more than 60% (preferably at least 10% and not more than 40%) of the $L_w$. By implementing this, the effects of the present invention can be expressed at even higher levels.

In another preferred aspect of the herein disclosed exhaust gas purification catalyst, the length (average length) $L_1$ of the first catalyst layer is at least 20% and not more than 90% of the $L_w$. The exhaust gas purification capacity can be even more favorably expressed by disposing the catalyst metal in a section that is at least 20% of the total length $L_w$ in the extending direction of the partition from the exhaust gas inflow-side end. In addition, increases in the pressure loss can be better suppressed by having $L_1$ be not more than 90% of the $L_w$.

In another preferred aspect of the herein disclosed exhaust gas purification catalyst, the length (average length) $L_2$ of the second catalyst layer is at least 20% and not more than 90% of the $L_w$. The exhaust gas purification capacity can be even more favorably expressed by disposing the catalyst metal in a section that is at least 20% of the total length $L_w$ in the extending direction of the partition from the exhaust gas outflow-side end. In addition, increases in the pressure loss can be better suppressed by having $L_2$ be not more than 90% of the $L_w$.

In another preferred aspect of the herein disclosed exhaust gas purification catalyst, the following formula $0.2T_w \leq (T_w - T_1 - T_2) \leq 0.4T_w$ is satisfied where, considered in the thickness direction orthogonal to the extending direction, the $T_w$ is the thickness of the partition, the $T_1$ is the thickness of the first catalyst layer, and the $T_2$ is the thickness of the second catalyst layer. By implementing this, the catalyst metal can be efficiently utilized and the amount of use of the catalyst metal can then be reduced. In addition, by avoiding stacking of the catalyst layers on each other in the thickness direction, the occurrence of migration of the catalyst metal can be impeded. Deterioration of the catalyst by sintering and alloying can be inhibited as a result. The catalytic activity can then be stably expressed on a long-term basis.

DESCRIPTION OF EMBODIMENTS

Several preferred embodiments of the present invention are described in the following with reference to the figures. In the figures below, members and positions that exercise the same function are assigned the same reference sign and duplicate descriptions are either omitted or simplified. The dimensional relationships (length, width, thickness, and so forth) in the individual figures do not necessarily reflect actual dimensional relationships. Moreover, matters required for the execution of the present invention but not particularly described in this Description can be understood as design matters for a person skilled in the art based on the conventional art in the pertinent field. The present invention can be executed based on the contents disclosed in this Description and the common general technical knowledge in the pertinent field.

The herein disclosed exhaust gas purification catalyst is provided with a substrate having a wall-flow structure and with two catalyst layers that are disposed in the partitions of this substrate. A characteristic feature is that the two catalyst layers partially overlap with each other in the extending direction of the partition. There are thus no particular limitations on the other structures. The exhaust gas purification catalyst of the present invention can be provided, for example, by suitably selecting the substrate, support, and catalyst metal, vide infra, and molding into a desired shape in accordance with the application.

Figure 1:
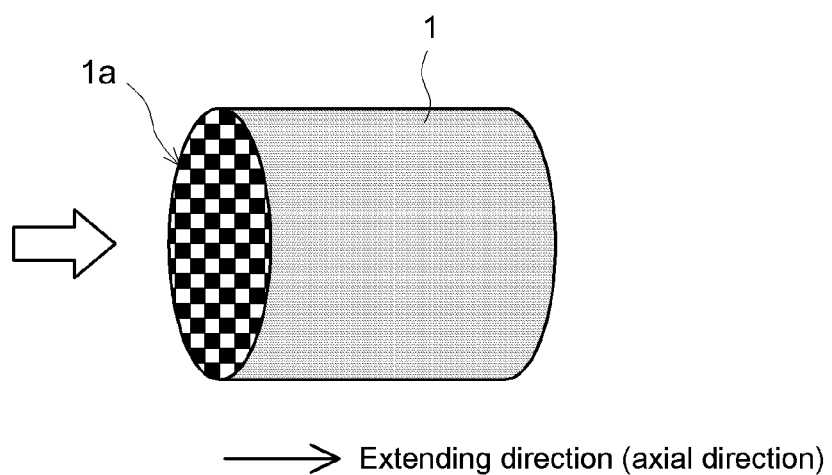
FIG. 1 is a perspective diagram that schematically shows a substrate for an exhaust gas purification catalyst according to an embodiment of the present invention.
Figure 2:
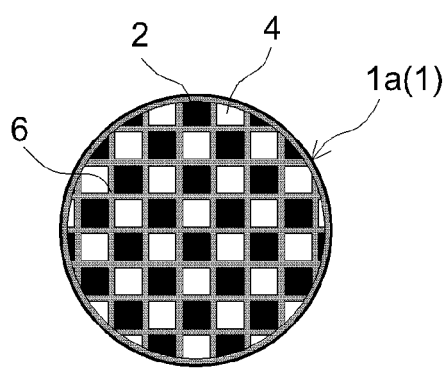
FIG. 2 is a cross-sectional diagram that schematically shows an end of the honeycomb substrate of FIG. 1.

The substrate having a wall-flow structure is described first. The substrate constitutes the framework of the herein disclosed exhaust gas purification catalyst. The substrates heretofore used in this type of application can be used as appropriate as this substrate. FIG. 1 is a schematic diagram that shows an example of the substrate. The substrate shown in FIG. 1 is a honeycomb substrate (honeycomb structure) 1 having a cylindrical outer shape. The honeycomb substrate 1 has a plurality of cells that are regularly arranged along the extending direction of the honeycomb substrate 1 (direction of the cylinder axis of the cylindrical shape) and has partitions that divide these cells. For cells adjacent to each other, the open end of one in the extending direction and the open end of another one are alternately sealed off. FIG. 2 is a schematic diagram that shows the cross section of the end 1a of the honeycomb substrate 1. In this embodiment, the end 1a has an approximately cylindrical shape. A sealed part 2 and an open part 4 are arranged in a checkerboard pattern at the end 1a. A porous partition 6 is disposed between the sealed part 2 and the open part 4.

The honeycomb substrate 1 should be composed of heat-resistant material capable of accommodating, for example, the removal of PM by high-temperature combustion as well as exposure to the high-temperature (for example, 400° C. and above) exhaust gas produced when an internal combustion engine is operated under high-load conditions. The heat-resistant materials can be exemplified by ceramics such as cordierite, aluminum titanate, and silicon carbide (SiC) and by alloys such as stainless steel. The capacity of the honeycomb substrate 1 (total cell volume) should generally be at least 0.1 L and is preferably at least 0.5 L and, for example, may be not more than 5 L and is preferably not more than 3 L and more preferably not more than 2 L. The total length of the honeycomb substrate 1 in the extending direction (i.e., the total length $L_w$ in the extending direction of the partition 6) should generally be 10 to 500 mm, for example, about 50 to 300 mm. From the standpoint of, for example, improving the exhaust gas purification performance and mechanical strength and suppressing pressure losses, the thickness of the partition 6 (the length in the direction perpendicular to the extending direction) should be, for example, about 0.05 to 2 mm. From the standpoint of, for example, improving the mechanical strength and suppressing pressure losses, the porosity of the partition 6 should generally be about 40% to 70%. From the standpoint of improving the PM capture performance and suppressing pressure losses, the average pore diameter in the partition 6 should generally be about 10 to 40 µm. Besides a cylindrical shape as in FIG. 1, the outer shape of the overall honeycomb substrate 1 may also be, for example, an elliptical cylindrical shape or a polygonal cylindrical shape.

The exhaust gas purification catalyst formed using the honeycomb substrate 1 is described next.

Figure 3:
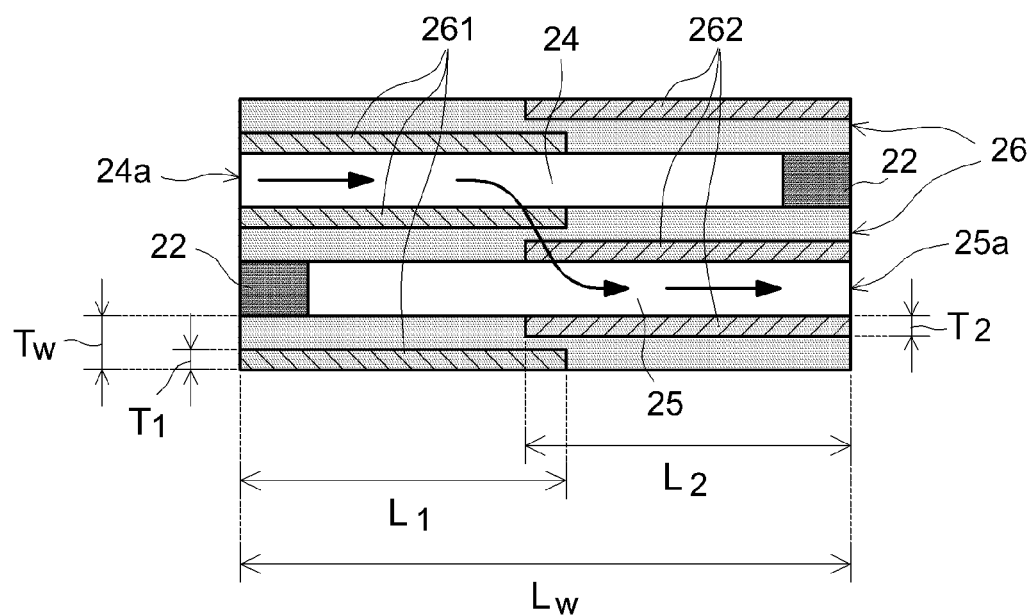
FIG. 3 is an enlarged cross-sectional diagram that schematically shows the structure in the vicinity of the partition of an exhaust gas purification catalyst according to an embodiment of the present invention.

FIG. 3 is an enlarged cross-sectional diagram that schematically shows the structure in the vicinity of the partition of an exhaust gas purification catalyst 10 according to an embodiment of the present invention. The direction of exhaust gas flow is indicated in this figure by the arrows. Thus, the left side as one faces FIG. 3 is upstream in the exhaust gas flow path (exhaust pipe), and the right side as one faces FIG. 3 is downstream in the exhaust gas flow path. The exhaust gas purification catalyst 10 has what is known as a wall-flow structure. The exhaust gas purification catalyst 10 is provided with an entrance cell 24 (rectangular strip-shaped) for which the exhaust gas inflow-side end 24*a* is open; an exit cell 25 (rectangular strip-shaped) residing adjacent to this entrance cell and for which the exhaust gas outflow-side end 25*a* is open; and a porous partition 26 that divides the two cells. A sealed part 22 is disposed at and seals off the exhaust gas outflow-side end 25*a* of the entrance cell 24 and the exhaust gas inflow-side end 24*a* of the exit cell 25. Two catalyst layers (i.e., a first catalyst layer 261 and a second catalyst layer 262) having prescribed properties (for example, length, thickness, precious metal loading) are formed in the interior part of the partition 26 (specifically, within the pores of the partition 26).

In an exhaust gas purification catalyst 10 having such a structure, the exhaust gas discharged from an internal combustion engine flows through the exhaust gas inflow-side end 24*a* into and within the entrance cell 24, passes through within the pores of the porous partition 26, and exits from the exhaust gas outflow-side end 25*a* of an adjacent exit cell 25. The harmful components in the exhaust gas are purified (detoxified) through contact with the catalyst layers during passage within the exhaust gas purification catalyst 10. For example, the HC component and CO component present in the exhaust gas are oxidized by the catalytic function of the catalyst layers and are thereby converted (purified) into, e.g., water ($H_2O$) and carbon dioxide ($CO_2$). The $NO_x$ component is reduced by the catalytic function of the catalyst layers and is thereby converted (purified) into nitrogen ($N_2$). The PM component, due to its poor ability to pass through the pores in the partition 26, generally accumulates on the partition 26 in the entrance cell 24. The accumulated PM is decomposed and eliminated by the catalytic function of the catalytic layers or by combustion at a prescribed temperature (for example, about 500° C. to 700° C.).

The two catalyst layers (a first catalyst layer 261 and a second catalyst layer 262) form, as the sites of exhaust gas purification, the primary constituents of the exhaust gas purification catalyst 10. The two catalyst layers are each provided with catalyst metal particles that function as an oxidation and/or reduction catalyst and with a support that supports the catalyst metal particles.

Various metal species that can function as oxidation catalysts and/or reduction catalysts can be considered for the catalyst metal. Typical examples are precious metals from the platinum group, e.g., rhodium (Rh), palladium (Pd), and platinum (Pt). Or, ruthenium (Ru), osmium (Os), iridium (Ir), silver (Ag), and gold (Au) can also be used. Also usable are alloys of two or more selections from these metals. In addition, the catalyst metal may be another metal species, e.g., an alkali metal, alkaline-earth metal, or transition metal. From the standpoint of increasing the area of contact with the exhaust gas, the catalyst metal is preferably used in the form of microfine particles having a suitably small particle diameter. The average particle diameter of the catalyst metal particles (the average value of the particle diameter as determined by observation with a transmission electron microscope; this also applies in the following) is generally about 1 to 15 nm and may be not more than 10 nm, not more than 7 nm, or not more than 5 nm.

The first catalyst layer 261 and the second catalyst layer 262 may contain the same metal species or may contain different metal species. As one example, use may be made, respectively, of a metal species having a high reduction activity (for example, rhodium) in one catalyst layer (for example, the first catalyst layer 261) and a metal species having a high oxidation activity (for example, palladium and/or platinum) in the other catalyst layer (for example, the second catalyst layer 262). In another example, the same metal species (for example, rhodium) can be used in the two catalyst layers (the first catalyst layer 261 and the second catalyst layer 262).

In a preferred embodiment, the first catalyst layer 261, which is proximal to the exhaust gas inflow side, contains at least Rh or an alloy of Rh and the second catalyst layer 262, which is proximal to the exhaust gas outflow side, contains at least Rh, Pd, or Pt or an alloy of these metals. This makes it possible for the purification activity of the catalyst metals to be expressed at high levels.

The catalyst metal loading rate (the catalyst metal content when the support is taken to be 100 mass %) may be the same in the first catalyst layer 261 as in the second catalyst layer 262 or may differ therebetween. The loading rate for the catalyst metal in each catalyst layer is not particularly limited because it can vary as a function of, for example, the length and thickness of the catalyst layer, but in each case may be not more than about 1.5 mass % and is preferably 0.05 to 1.5 mass % and is more preferably 0.2 to 1 mass %. The appearance of the exhaust gas purification action of the catalyst metal is facilitated by having the loading rate be at least the prescribed value. In addition, the progression of particle growth by the metal (sintering) and an increase in the pressure loss can be suppressed by having the loading rate be not more than the prescribed value. This is also advantageous with regard to cost.

Inorganic compounds heretofore used for this type of exhaust gas purification catalyst can be considered for the support that supports the catalyst metal. Among these, porous supports having a relatively large specific surface area (this refers to the specific surface area measured by the BET method, which also applies below) can be preferably used. Advantageous examples are alumina ($Al_2O_3$), ceria (CeO$_2$), zirconia (ZrO$_2$), silica (SiO$_2$), and titania (TiO$_2$) as well as their solid solutions (for example, ceria-zirconia composite oxide (CZ composite oxide)) and their combinations. From the perspective of the heat resistance and structural stability, the support particle (for example, an alumina powder or a CZ composite oxide powder) should have a specific surface area of 10 to 500 m$^2$/g, for example, 200 to 400 m$^2$/g. The average particle diameter of the support particle may typically be 1 to 500 nm, for example, 10 to 200 nm. The first catalyst layer 261 and the second catalyst layer 262 may contain the same species of support or may contain different species.

The first catalyst layer 261 is formed in a region of the interior part of the partition 26 that is in contact with the entrance cell 24 and is formed along the extending direction from the exhaust gas inflow-side end 24a for less than the total length $L_w$ of the partition 26. The exhaust gas that has flowed into the entrance cell 24 passes through the interior of the partition 26. As a consequence, the exhaust gas purification performance during passage through the partition 26 can be effectively raised by disposing the first catalyst layer 261 in the interior part of the partition 26. In addition, according to investigations by the present inventors, this structure is also particularly effective from the standpoint of reducing the pressure loss during exhaust gas inflow.

The length (average length) $L_1$ of the first catalyst layer 261 in the extending direction should be at least about 20% of the $L_w$ and typically is at least 25% and is preferably at least 30%, for example, at least 50%, and may be not more than about 90% and typically is not more than 85% and is preferably not more than 80%, for example, not more than 70%. In the embodiment shown in FIG. 3, the length $L_1$ of the first catalyst layer 261 is approximately 60% of the $L_w$. According to investigations by the present inventors, ash (ASH) composed of uncombusted components tends to readily deposit in the region in the vicinity of the sealed part 22 of the entrance cell 24. Due to this, increases in the pressure loss can be advantageously suppressed by having $L_1$ be not more than the prescribed value. In addition, the exhaust gas purification capacity can be more advantageously exhibited by having $L_1$ be at least the prescribed value.

The second catalyst layer 262 is formed in a region of the interior part of the partition 26 that is in contact with the exit cell 25 and is formed along the extending direction from the exhaust gas outflow-side end 25a for less than the total length $L_w$ of the partition 26.

The length (average length) $L_2$ of the second catalyst layer 262 in the extending direction may be at least about 20% of the $L_w$ and typically is at least 25%, for example, at least 30% and preferably at least 50%, and may be not more than about 90% and typically is not more than 85% and is preferably not more than 80%, for example, not more than 70%. In the embodiment shown in FIG. 3, the length $L_2$ of the second catalyst layer 262 is approximately 60% of the $L_w$. By doing this, a high purification performance can be realized while suppressing increases in the pressure loss.

In the embodiment shown in FIG. 3, the length of the first catalyst layer 261 is about equal to the length of the second catalyst layer 262. However, there is no limitation to this. For example, the length of one catalyst layer can be relatively longer and the length of the other catalyst layer can be relatively shorter.

The total length $L_w$ of the partition 26, the length $L_1$ of the first catalyst layer 261, and the length $L_2$ of the second catalyst layer 262 satisfy the following formula $L_w<(L_1+L_2)<2L_w$ in the exhaust gas purification catalyst 10. In other words, a portion of the first catalyst layer 261 overlaps a portion of the second catalyst layer 262 in the extending direction of the partition 26. The intentional overlapping of the first catalyst layer 261 with the second catalyst layer 262 in the extending direction prevents the exhaust gas from passing through a region where no catalyst layer is formed and thus prevents its direct discharge without purification. By doing this, the exhaust gas components are properly brought into contact with the catalyst layers and the emissions can be effectively reduced.

The length of the overlap in the extending direction between the first catalyst layer 261 and the second catalyst layer 262 is not particularly limited because it can vary with, for example, the thickness of the individual catalyst layers. Generally, it should be at least about 2% of the $L_w$ and is typically at least 5% and is preferably at least 10%, for example, at least 20%, and should be not more than about 60% and is typically not more than 50% and is preferably not more than 40%. From the standpoint of a high degree of coexistence between low cost and high performance, about 10 to 25% of the $L_w$ is preferred.

The thicknesses (average thicknesses) of the first catalyst layer 261 and the second catalyst layer 262 are not particularly limited because they can vary as a function of, for example, the total thickness $T_w$ of the partition 26, the length of the catalyst layers in the extending direction, and so forth. The first catalyst layer 261 and the second catalyst layer 262 are each typically formed to be shorter than the total thickness $T_w$ of the partition 26. For example, the thickness $T_1$ of the first catalyst layer 261 and the thickness $T_2$ of the second catalyst layer 262 should each be at least 20% of the $T_w$ and are each typically at least 25% and preferably at least 30%, for example, at least 35%, and should each be not more than 90% and are each typically not more than 80%, for example, not more than 70%.

In a preferred embodiment, the following formula $0.2T_w \leq (T_w-T_1-T_2) \leq 0.4T_w$ is satisfied where $T_w$ is the total thickness of the partition, $T_1$ is the thickness of the first catalyst layer 261, and $T_2$ is the thickness of the second catalyst layer 262. In other words, a gap remains open such that the first catalyst layer 261 and the second catalyst layer 262 are not in contact in the thickness direction. Thus, a region composed of only substrate and with a thickness of approximately 20% to 40% (for example, 25% to 35%) of the $T_w$ is preferably disposed in the thickness direction between the first catalyst layer 261 and the second catalyst layer 262. Doing this enables a stable expression of the desired catalytic performance. In addition, migration of the catalyst metal can be inhibited and the deterioration of the catalyst metal by sintering and alloying can be suppressed.

The catalyst layers as described above can be formed by the same methods as heretofore.

For example, the exhaust gas purification catalyst 10 in the embodiment shown in FIG. 3 may be formed as follows.

First, a honeycomb substrate 1 as shown in FIGS. 1 and 2 is prepared and the first catalyst layer 261 is formed in the interior part of the partitions in the honeycomb substrate 1. Specifically, a first catalyst layer-forming slurry is prepared that contains the desired catalyst metal component (specifically, a solution that contains the catalyst metal in ion form) and the desired support powder. With regard to the properties of the slurry (e.g., viscosity and solids fraction content), preparation should be carried out considering, for example, the size of the honeycomb substrate 1 used and the porosity of the partition 26. This slurry is then supplied into the entrance cell 24 from the exhaust gas inflow-side end 24a of the honeycomb substrate 1 and a first catalyst layer 261 having the desired properties is formed within the pores of the partition 26 by an internal coating method. The properties (e.g., the thickness and porosity) of the first catalyst layer 261 can be adjusted, for example, through the properties of the slurry and amount of slurry supplied. Or, by pressurizing the exit cell 25 during slurry supply and generating a pressure difference between the entrance cell 24 and the exit cell 25, adjustments may be performed so as to avoid excessive permeation of the slurry within the partition 26.

A second catalyst layer-forming slurry is then prepared proceeding as in the formation of the first catalyst layer 261. This slurry is supplied into the exit cell 25 from the exhaust gas outflow-side end 25a of the honeycomb substrate 1 and a second catalyst layer 262 having the desired properties is formed within the pores of the partition 26 by an internal coating method.

After slurry application, the honeycomb substrate 1 is dried and baked at prescribed temperatures and for prescribed times. The exhaust gas purification catalyst 10 shown in FIG. 3 can be produced by proceeding in the described manner.

In addition to the catalyst metal and support, the catalyst layer-forming slurry may optionally contain additional components such as, for example, a heretofore known oxygen storage material, binder, additive, and so forth. The oxygen storage material can be exemplified by CZ composite oxides in the role of the support or not in the role of the support. The binder can be exemplified by alumina sol and silica sol.

The herein disclosed exhaust gas purification catalyst can exhibit an excellent exhaust gas purification performance and can do so while suppressing pressure loss increases. Accordingly, it can be advantageously disposed in the exhaust system (exhaust pipe) of a variety of internal combustion engines, for example, automobile gasoline engines and diesel engines. With gasoline engines in particular, since they are usually controlled at the stoichiometric air-fuel ratio, the exhaust gas then easily flows in the partition region near the inflow-side end and in the partition region near the outflow-side end. The application of the present invention is thus particularly effective as a result.

Several examples in relation to the present invention are described below, but this does not mean that the present invention is limited to these specific examples.

<<I. Examination of the Size (Length, Thickness) of the Catalyst Layers>>

EXAMPLE 1

A cordierite honeycomb substrate having a cell count of 300 cpsi (cells per square inch), a volume (refers to the bulk volume of the whole article, also including the volume of the cell flow paths) of 0.9 L, a total length of 105 mm, an outer diameter of 103 mm, a partition thickness of 0.3 mm, and a porosity of 59% was prepared as the substrate.

An appropriate amount of pure water was then mixed with 40 g of $Al_2O_3$ powder ($\gamma$-$Al_2O_3$) as the support and with an appropriate amount of an aqueous rhodium solution having an Rh content of 0.2 g as the catalyst metal. The obtained mixture was stirred and mixed and then dried and baked (500° C., 1 hour) to obtain a catalyst metal-loaded powder in which Rh was loaded on the $Al_2O_3$ powder. A catalyst layer-forming slurry was prepared by mixing this catalyst metal-loaded powder with an appropriate amount of pure water and a ceria-zirconia composite oxide solution that provided 60 g of CZ composite oxide after baking.

This slurry was then supplied from the exhaust gas inflow-side end of the honeycomb substrate into the entrance cells so as to provide a catalyst metal loading post-baking of 100 g per 1 L of substrate, thereby forming a first catalyst layer (length $L_1$ in the extending direction: 30% of the total length of the partition; thickness $T_1$: 35% of the thickness of the partition) within the pores of the partition in contact with the entrance cells. During this process, the depth of permeation by the slurry within the partition was adjusted by supplying gas from the exhaust gas outflow-side end of the exit cells in order to produce a relative pressure difference between the entrance cells and exit cells.

The aforementioned slurry was then supplied from the exhaust gas outflow-side end of the honeycomb substrate into the exit cells so as to provide a catalyst metal loading post-baking of 100 g per 1 L of substrate, thereby forming a second catalyst layer (length $L_2$ in the extending direction: 30% of the total length of the partition; thickness $T_2$: 35% of the thickness of the partition) within the pores of the partition in contact with the exit cells. During this process, the depth of permeation by the slurry within the partition was adjusted by supplying gas from the exhaust gas inflow-side end of the entrance cells in order to produce a relative pressure difference between the entrance cells and exit cells.

After drying for 1 hour at 150° C., baking was carried out for 1 hour at 500° C. in order to obtain an exhaust gas purification catalyst (Example 1). In Example 1, a region lacking a catalyst layer was present in the central part of the partition in the extending direction over 40% of the total length $L_w$ of the partition.

EXAMPLE 2

An exhaust gas purification catalyst (Example 2) was produced proceeding as in Example 1, but making the length in the extending direction of both the first catalyst layer and the second catalyst layer 50% of the total length $L_w$ in the extending direction of the partition.

EXAMPLE 3

An exhaust gas purification catalyst (Example 3) was produced proceeding as in Example 1, but making the length in the extending direction of both the first catalyst layer and the second catalyst layer 55% of the total length $L_w$ in the extending direction of the partition. In this example, the first catalyst layer overlaps with the second catalyst layer over a length of 10% of the $L_w$ in the extending direction. That is, in the central region of the partition in the extending direction, the first catalyst layer and the second catalyst layer are stacked in the thickness direction (with an intervening region in which no catalyst layer is formed), thus providing a multilayer structure.

EXAMPLE 4 to EXAMPLE 9

Proceeding as in Example 3, exhaust gas purification catalysts (Example 4, Example 5) were produced in which the first catalyst layer and the second catalyst layer were partially overlapped in the extending direction, but forming the lengths $L_1$ and $L_2$ of the first catalyst layer and the second catalyst layer in the extending direction as shown in Table 1. In addition, as reference examples, exhaust gas purification catalysts (Example 6 to Example 9) were produced proceeding as in Example 1, but forming the first catalyst layer and the second catalyst layer with the thicknesses $T_1$ and $T_2$ and the lengths $L_1$ and $L_2$ in the extending direction as shown in Table 1.

The specifications of the catalyst layers are summarized in Table 1 below.

TABLE 1

Specifications of the catalyst layers and exhaust gas purification percentage (1)

| | extending direction | | | thickness direction | | | purification percentage (%) | |
|---|---|---|---|---|---|---|---|---|
| | first catalyst layer $L_1$ | second catalyst layer $L_2$ | overlap $L_1 + L_2 -$ 100 (%) | first catalyst layer $T_1$ | second catalyst layer $T_2$ | gap 100 − $T_1 - T_2$ (%) | HC | $NO_x$ |
| | (%)*1 | (%)*1 | | (%)*2 | (%)*2 | | | |
| Example 1 | 30 | 30 | −40 | 35 | 35 | 30 | 72 | 84 |
| Example 2 | 50 | 50 | 0 | | | | 84 | 87 |
| Example 3 | 55 | 55 | 10 | | | | 93 | 95 |
| Example 4 | 70 | 70 | 40 | | | | 92 | 94.5 |
| Example 5 | 80 | 80 | 60 | | | | 91.5 | 92 |
| Example 6 | 50 | 50 | 0 | 50 | 50 | 0 | 90 | 92 |
| Example 7 | 50 | 50 | 0 | 70 | 70 | −40 | 93 | 94.5 |
| Example 8 | 55 | 55 | 10 | 70 | 70 | −40 | 93.5 | 95 |
| Example 9 | 45 | 45 | −10 | 70 | 70 | −40 | 80 | 86 |

*1 relative value using 100% for the total length $L_w$ of the partition in the extending direction
*2 relative value using 100% for the total thickness $T_w$ of the partition <Evaluation of the Exhaust Gas Purification Performance>

Figure 4:
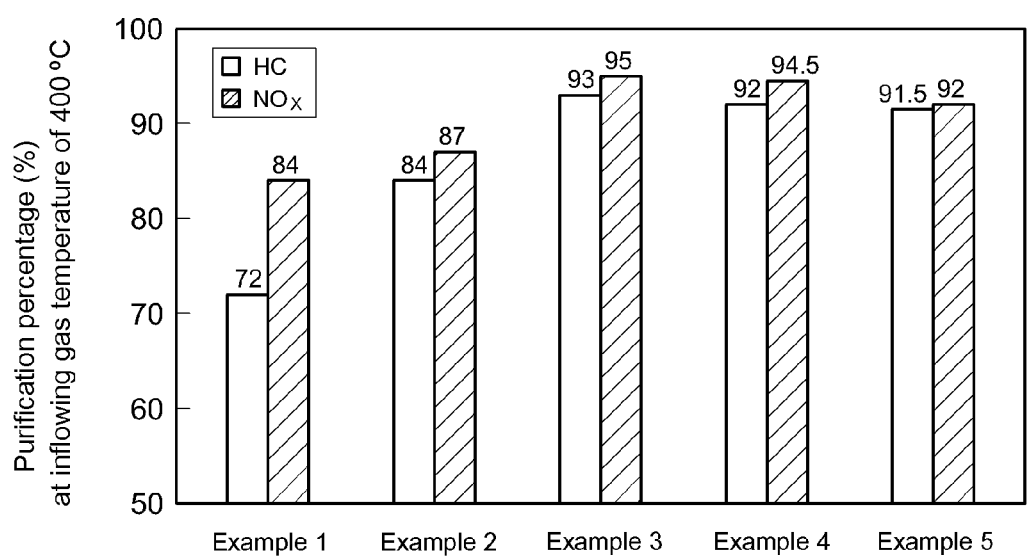
FIG. 4 is a graph that compares the purification performance of exhaust gas purification catalysts.

The exhaust gas purification catalysts (Example 1 to Example 9) obtained as described above were installed in the exhaust pipe of a gasoline engine and their exhaust gas purification performances were compared. Specifically, the exhaust gas purification catalyst was installed in the exhaust system of an engine bench; the evaluation temperature of the exhaust gas (inflowing gas temperature) was adjusted to 400° C.; and the purification percentages for the HC component and $NO_x$ component were measured. The results are shown in the corresponding columns in Table 1. In addition, FIG. 4 gives a graph that compares the purification performances of the exhaust gas purification catalysts according to Example 1 to Example 5.

The appropriate range for the overlap in the extending direction is considered first. As is clear from FIG. 4, the purification performance was the worst in Example 1. The reason for this is thought to reside in the existence of a region in the extending direction of the partition where no catalyst metal was loaded, resulting in slip through of unpurified harmful components therethrough. In addition, Example 2 had an improved purification performance over that in Example 1, but about 15% of the harmful component was still unpurified and was discharged.

In contrast to this, a relatively high purification performance was exhibited in Example 3 to Example 5, in which the two catalyst layers were overlapped with each other in the extending direction. In particular, the best purification performance was exhibited in Example 3 and Example 4, in which the overlap in the extending direction was 10% to 40% of the total length $L_w$ of the partition.

The purification performance in Example 5, in which the overlap in the extending direction was 60% of the total length $L_w$ of the partition, was somewhat lower than in Example 3 and Example 4. The reason for this is thought to be the pressure loss difference between the entrance cell and the exit cell. That is, because the catalyst metal is loaded over a broad range in Example 5, the pressure loss difference between the entrance cell and the exit cell becomes large.

Due to this, it is thought that the exhaust gas ends up passing through the interior of the catalyst layers (particularly the interior of the partition) more rapidly and the purification performance is then reduced in comparison to Example 3 and Example 4.

Based on the preceding, a relatively high exhaust gas purification performance can be realized by having the first catalyst layer and the second catalyst layer partially overlap in the extending direction of the partition. In addition, the overlap in the extending direction is preferably at least 2% and not more than 60% (particularly at least 10% and not more than 40%) of the total length $L_w$ of the partition. These results demonstrate the technical significance of the present invention.

The appropriate range for the thickness direction will be considered by comparing test examples that had the same overlap in the extending direction (Example 3, Example 8). The porosity in Example 3 was about the same as in Example 8, which is a reference example. Based on this, a gap of about 20% to 40% (typically 25% to 35%) of the $T_w$ is preferably disposed in the thickness direction between the first catalyst layer and the second catalyst layer. That is, $T_w - T_1 - T_2$ for the thickness direction can be at least $0.2T_w$ and not more than $0.4T_w$. By doing this, the productivity and the ease of operation can be increased. Moreover, a desirable catalyst performance can be exhibited and, in combination with this, migration of the catalyst metal can be suppressed and the deterioration of the catalyst metal by sintering and alloying can be inhibited.

In addition, based on a comparison of Example 2 with Example 6 and Example 7, which are reference examples, when the overlap is 0 (thus, $L_w = (L_1 + L_2)$) the catalyst layers should be uninterruptedly present in the thickness direction or the first catalyst layer and the second catalyst layer should be configured to partially overlap in the thickness direction. That is, the following formula $T_w (T_1 + T_2) < 2T_w$ should be satisfied. By doing this, a relatively high exhaust gas purification performance can be realized.

<<II. Examination of the Catalyst Metal Species>>

EXAMPLE 10 to EXAMPLE 12

Exhaust gas purification catalysts (Example 10 to Example 12) were produced proceeding as in Example 8, but changing the catalyst metal species as shown in Table 2. The exhaust gas purification performance was evaluated as in I. above. The results are given in the corresponding columns of Table 2.

TABLE 2

Examination of the catalyst metal species

| | catalyst metal species | | purification percentage (%) | |
|---|---|---|---|---|
| | first catalyst layer | second catalyst layer | HC | $NO_x$ |
| Example 10 | Rh | Pt | 89 | 91 |
| Example 11 | Rh | Pd | 93 | 95 |
| Example 12 | Pd | Rh | 92 | 94.5 |
| Example 8 | Rh | Rh | 93.5 | 95 |

As is clear from Table 2, the purification percentage was particularly high when rhodium was used in the first catalyst layer and rhodium or palladium was used in the second catalyst layer. Based on this, rhodium is preferably used as the catalyst metal species in the first catalyst layer and the second catalyst layer. Or, in another advantageous example, the use is preferred of rhodium, which has a high reduction activity, in the first catalyst layer and palladium, which has a high oxidation activity, in the second catalyst layer.

<<III. Detailed Examination of the Overlap of the Two Catalyst Layers>>

EXAMPLE 13 to EXAMPLE 16

Exhaust gas purification catalysts (Example 13 to Example 16) were produced proceeding as in Example 4 above, but forming the length $L_2$ of the second catalyst layer in the extending direction as shown in Table 3. The exhaust gas purification performance was evaluated as in I. above. The results are given in the corresponding columns in Table 3.

TABLE 3

Specifications of the catalyst layers and exhaust gas purification percentage (2)

| | extending direction | | | thickness direction | | | purification percentage (%) | |
|---|---|---|---|---|---|---|---|---|
| | first catalyst layer $L_1$ | second catalyst layer $L_2$ | overlap $L_1 + L_2 -$ | first catalyst layer $T_1$ | second catalyst layer $T_2$ | gap $100 - T_1 - T_2$ | | |
| | (%)*1 | (%)*1 | 100 (%) | (%)*2 | (%)*2 | (%) | HC | $NO_x$ |
| Example 13 | 70 | 35 | 5 | 35 | 35 | 30 | 90.7 | 93 |
| Example 14 | | 45 | 15 | | | | 93.6 | 97.2 |
| Example 15 | | 55 | 25 | | | | 93.4 | 94.4 |
| Example 16 | | 65 | 35 | | | | 91.8 | 93.3 |
| Example 4 | | 70 | 40 | | | | 92 | 94.5 |

*1relative value using 100% for the total length $L_w$ of the partition in the extending direction
*2relative value using 100% for the total thickness $T_w$ of the partition As demonstrated by Tables 1 and 3, the purification performance was particularly good when the overlap in the extending direction between the two catalyst layers was 10 to 25% of the total length $L_w$ of the partition. These results demonstrate the technical significance of the present invention.

Specific examples of the present invention are described in detail above, but these are nothing more than examples and do not limit the claims. Various modifications and alterations of the specific examples provided above as examples are encompassed by the art described in the claims.

REFERENCE SIGNS LIST

1 Honeycomb substrate
1a End
2 Sealed part
4 Open part
6, 26 Partition
10 Exhaust gas purification catalyst
22 Sealed part
24 Entrance cell
24a Exhaust gas inflow-side end
25 Exit cell
25a Exhaust gas outflow-side end
261 First catalyst layer
262 Second catalyst layer

The invention claimed is:

1. A wall-flow exhaust gas purification catalyst that is disposed in an exhaust pipe of an internal combustion engine and that performs purification of an exhaust gas discharged from the internal combustion engine, the wall-flow exhaust gas purification catalyst comprising:
   a substrate having a wall-flow structure in which an entrance cell having an open exhaust gas inflow-side end is partitioned by a porous partition from an exit cell having an open exhaust gas outflow-side end;
   a first catalyst layer formed, in a region that is an interior part of the partition and that is in contact with the entrance cell, along the extending direction of the partition from the exhaust gas inflow-side end for less than a total length $L_w$ of the partition; and
   a second catalyst layer formed, in a region that is an interior part of the partition and that is in contact with the exit cell, along the extending direction of the partition from the exhaust gas outflow-side end for less than the total length $L_w$ of the partition,
   wherein, using $L_1$ for a length of the first catalyst layer in the extending direction and $L_2$ for a length of the second catalyst layer in the extending direction, the $L_w$, the $L_1$, and the $L_2$ satisfy the following formula $L_w < (L_1+L_2) < 2L_w$ and the first catalyst layer partially overlaps with the second catalyst layer in the extending direction,
   wherein at least at least 80 mass % of a total amount of catalyst is in the pores of the partition.

2. The exhaust gas purification catalyst according to claim 1, wherein the length in the extending direction of the overlap between the first catalyst layer and the second catalyst layer is at least 2% and not more than 60% of the $L_w$.

3. The exhaust gas purification catalyst according to claim 2, wherein the length of the overlap between the first catalyst layer and the second catalyst layer is at least 10% and not more than 40% of the $L_w$.

4. The exhaust gas purification catalyst according to claim 1, wherein the length $L_1$ of the first catalyst layer is at least 20% and not more than 90% of the $L_w$.

5. The exhaust gas purification catalyst according to claim 1, wherein the length $L_2$ of the second catalyst layer is at least 20% and not more than 90% of the $L_w$.

6. The exhaust gas purification catalyst according to claim 1, wherein the following formula $0.2T_w \leq (T_w - T_1 - T_2) \leq 0.4T_w$ is satisfied where, considered in the thickness direction orthogonal to the extending direction, $T_w$ is the total thickness of the partition, $T_1$ is the thickness of the first catalyst layer, and $T_2$ is the thickness of the second catalyst layer.

7. The exhaust gas purification catalyst according to claim 1, wherein the first catalyst layer comprises at least one of metals selected from the platinum group as catalyst metal particles.

8. The exhaust gas purification catalyst according to claim 1, wherein both the first catalyst layer and the second catalyst layer each comprises at least one of metals selected from the platinum group as catalyst metal particles.

9. The exhaust gas purification catalyst according to claim 1, wherein one of the first catalyst layer and the second catalyst layer comprises at least rhodium and the other contains at least one of rhodium, palladium and platinum.

* * * * *